United States Patent [19]
Goodnight et al.

[11] 3,958,922
[45] May 25, 1976

[54] DUCT BURNER ASSEMBLY

[75] Inventors: Hershel E. Goodnight; Richard R. Martin, both of Tulsa, Okla.

[73] Assignee: John Zink Company, Tulsa, Okla.

[22] Filed: Sept. 20, 1974

[21] Appl. No.: 507,692

[52] U.S. Cl. ................................. 432/222; 431/13; 431/163; 431/285; 23/277 C
[51] Int. Cl.² .......................................... F24H 3/14
[58] Field of Search ......... 23/277 C; 60/39.5, 39.55; 431/13, 163, 285, 253; 432/222, 223

[56] References Cited
UNITED STATES PATENTS

| | | |
|---|---|---|
| 1,381,370 | 6/1921 | Velazquez ........................... 431/163 |
| 2,544,299 | 3/1951 | Damon et al. ........................ 431/13 |
| 2,565,843 | 8/1951 | Dennison ............................ 432/223 |
| 3,443,550 | 5/1969 | May et al. ........................... 122/7 R |
| 3,830,620 | 8/1974 | Martin ................................ 432/222 |

*Primary Examiner*—Carroll B. Dority, Jr.
*Attorney, Agent, or Firm*—Head, Johnson & Chafin

[57] ABSTRACT

A duct burner primarily for use in raising the temperature of turbine exhaust gas (TEG) to a usable temperature to operate a steam generator or the like. The burner comprises an array of downstream facing burners capable of burning low grade fuel oil in a low oxygen environment, each burner being provided with gas burning backup and individual flame scan capabilities.

19 Claims, 7 Drawing Figures

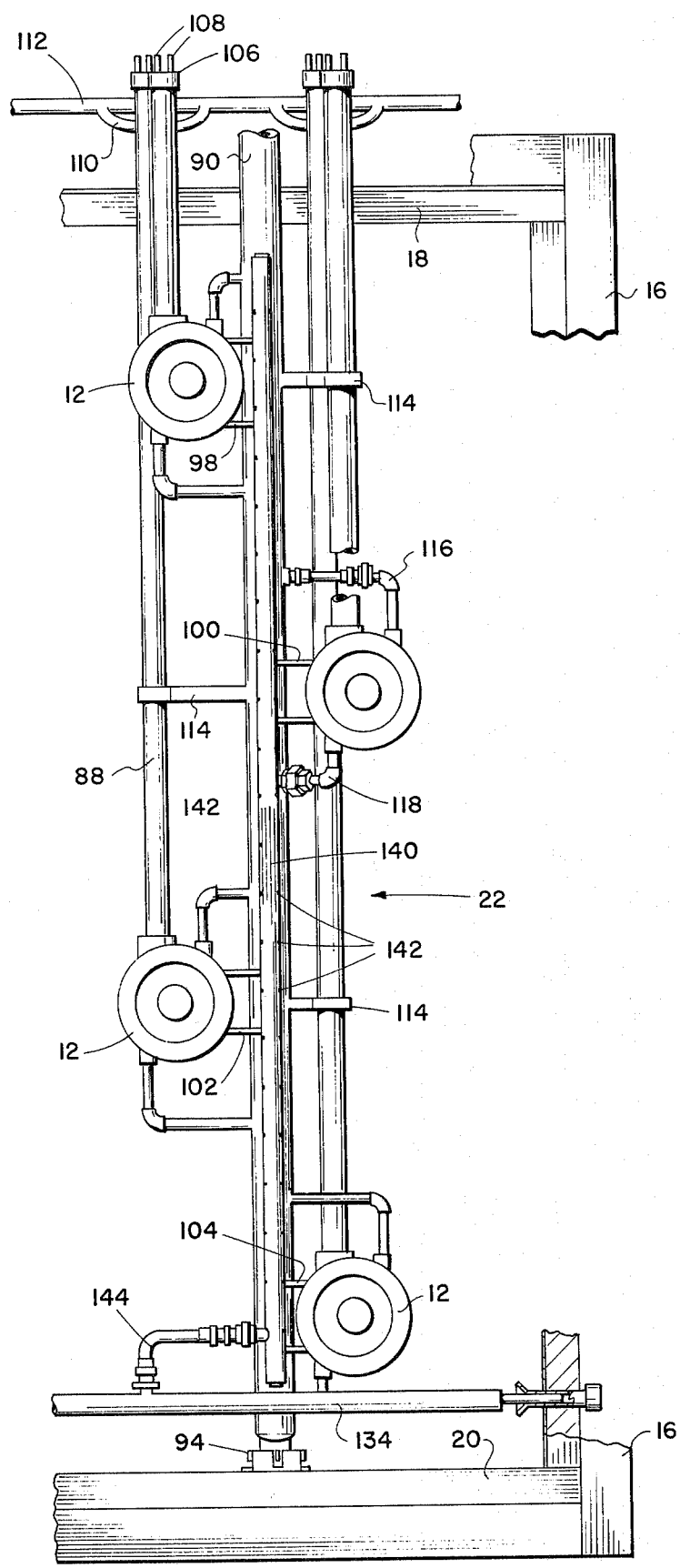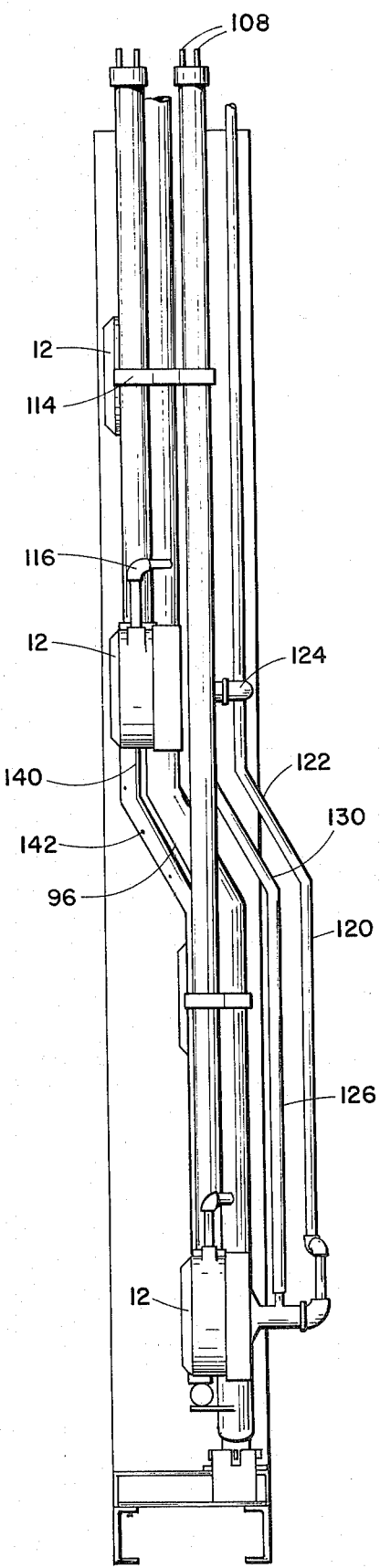
Fig. 4
Fig. 3

DUCT BURNER ASSEMBLY

BACKGROUND OF THE INVENTION

1. Field of the Invention

This invention relates to duct burners and more particularly, but not by way of limitation, to burners for operation in low oxygen environments such as in a turbine exhaust gas duct for raising the temperature thereof to a usable level.

2. Description of the Prior Art

Turbine exhaust gas (TEG) from gas turbines is usually considered waste gas since it has a temperature of only 600° – 800° Fahrenheit rendering it incapable of steam generation or the like.

Effective steam generation from air flow normally requires temperatures of 1,200° – 1400° Fahrenheit. The deficit temperature can easily be made up by gas burners located in the duct, but heating by gas is expensive and undesirable in the present energy crisis.

Also, it has been found that the typical TEG available has only about 16% oxygen which heretofore has been felt to be incapable of supporting combustion for burners using low grade fuel oil.

A further requirement levied by users of duct burner assemblies has been regardless of the type of fuel burners used, it is necessary to provide the capability of visually or electromagnetically monitoring the flame at each burner. This has proven difficult due to the arrangement of the burners in an array fashion and due to the fact that after intensive heat build up, the monitoring tubes either become blocked by smoke or the like or some visual or ultraviolet absorption takes place preventing adequate flame monitoring.

SUMMARY OF THE INVENTION

The present invention provides a duct burner assembly which is designed and constructed to overcome the above problems and provide an array of fuel oil burners for installation in the exhaust duct of a turbine exhaust gas system whereby the burner configuration permits substantially complete smokeless burning of the fuel.

Further, each of the burners are provided with gas burning capabilities for use with the fuel burners or as a backup for the said fuel burners.

The burners are arranged to be laterally offset with respect to each other to permit straight scanning tubes to attach to each said burner for visual or ultraviolet monitoring of the flame therein. A purge system is included in the monitoring means for clearing the tube of smoke and of other gasses which tend to block electromagnetic radiation, expecially in the ultraviolet spectrum.

Each burner is provided with a liquid fuel gun which is directed downstream with respect to the flow of turbine exhaust gas and which is capable of mixing fuel oil with steam to substantially atomize the fuel oil for subsequent combustion when mixed with the turbine exhaust gas. The steam is provided by a feed back tube from the boiler or steam generator downstream. The burner chamber for each burner is particularly designed to create a swirl pattern of the hot gasses therein for reburning and more complete combustion thereof to eliminate smoke and pollution.

DESCRIPTION OF THE DRAWINGS

Other and further advantageous features of the present invention will hereinafter more fully appear in connection with a detailed description of the drawings in which;

FIG. 3 is a side elevational sectional view of one column of burners taken along the broken line 3—3 of FIG. 2.

FIG. 4 is a front elevational view of the burner column of FIG. 3.

DESCRIPTION OF THE PREFERRED EMBODIMENT

Figure 1:
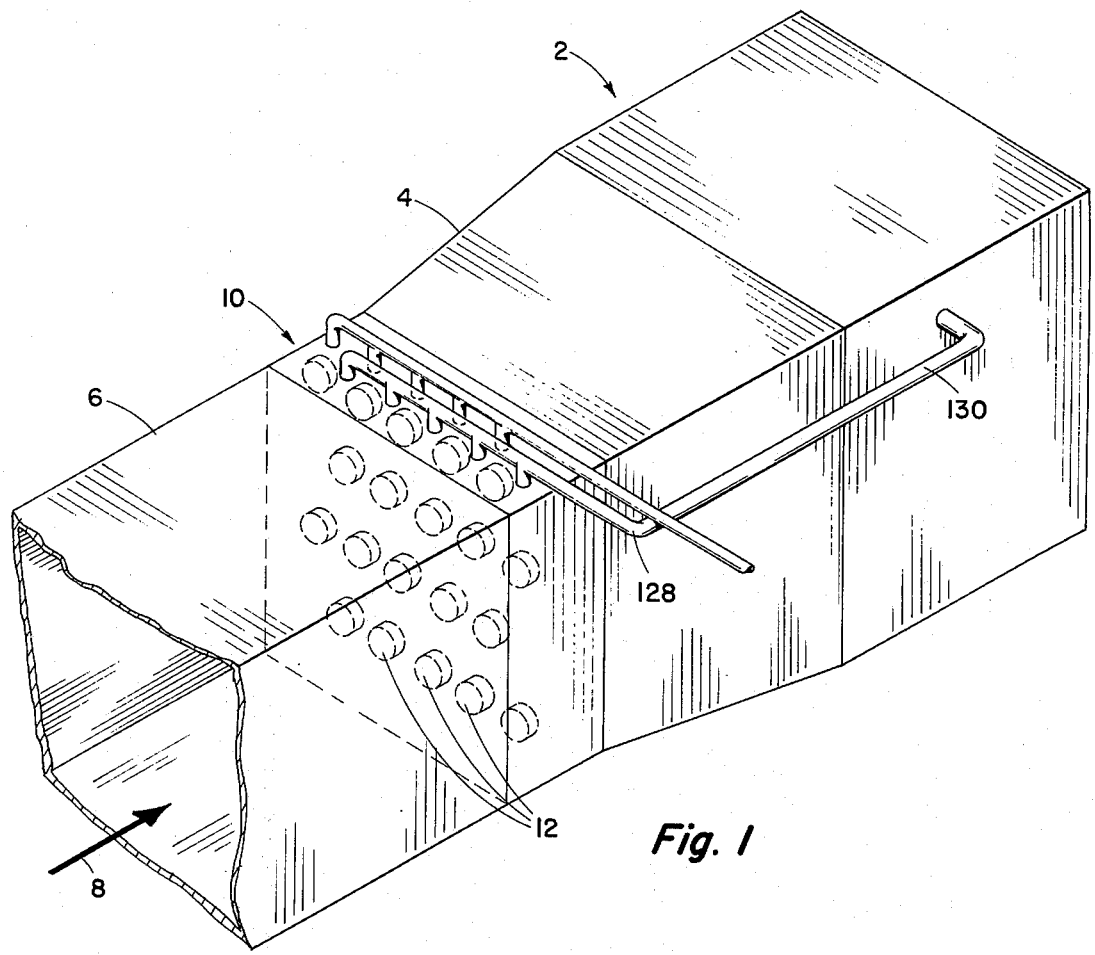
FIG. 1 is a perspective view of a boiler or steam generator connected to a turbine exhaust gas duct having a burner array therein embodying the present invention.
Figure 5:
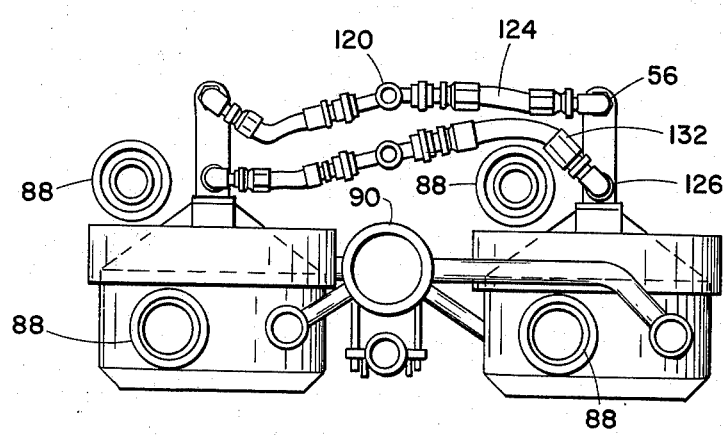
FIG. 5 is a top sectional view of a column of burners of FIG. 2 taken along the broken line 5—5 of FIG. 2.

Referring to the drawings in detail reference character 2 generally indicates a steam generator, boiler or the like having a hot air inlet duct 4 secured to one side thereof. The outer end of the inlet duct 4 is connected to a turbine exhaust gas (TEG) duct 6, the interior of which is in open communication with the interior of the hot air inlet duct 4. The TEG duct 6 is operably connected to the exhaust of a turbine generator or the like (not shown) wherein the direction of flow of the warm turbine exhaust gas is indicated by the arrow 8.

Reference Character 10 generally indicates a duct burner assembly comprising an array of burners 12 having flame shrouds directed downstream or with the flow of TEG.

Figure 2:
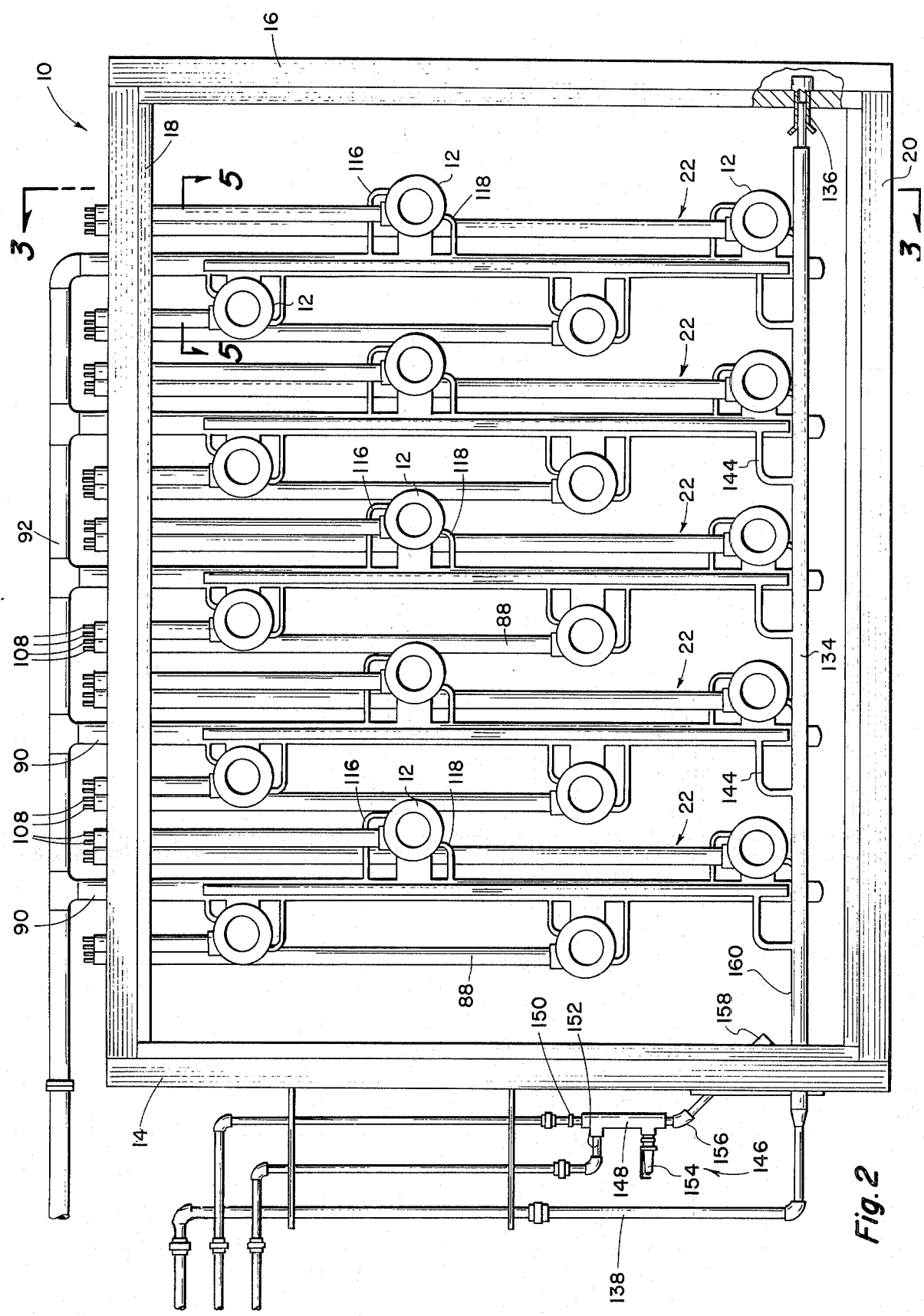
FIG. 2 is a sectional elevational view of the burner array of FIG. 1 facing the turbine exhaust gas flow stream.

Referring now to FIG. 2 the burner assembly 10 comprises a rectangular frame structure having oppositely disposed side frames 14 and 16, a top frame 18 connecting the two upper ends of the side frames 14 and 16 and an oppositely disposed bottom frame 20 connecting the lower ends of the side frames 14 and 16. The frame structure is designed in size and shape to conform to the inside surface of the TEG duct 6. The burner assembly 10 further comprises a plurality of vertical columns of burners generally indicated by reference Character 22, each column as shown in FIG. 2 consisting of four vertically spaced burners which are secured to the frame member by a plurality of pipe manifolds in a manner that will be hereinafter set forth.

Figure 6:
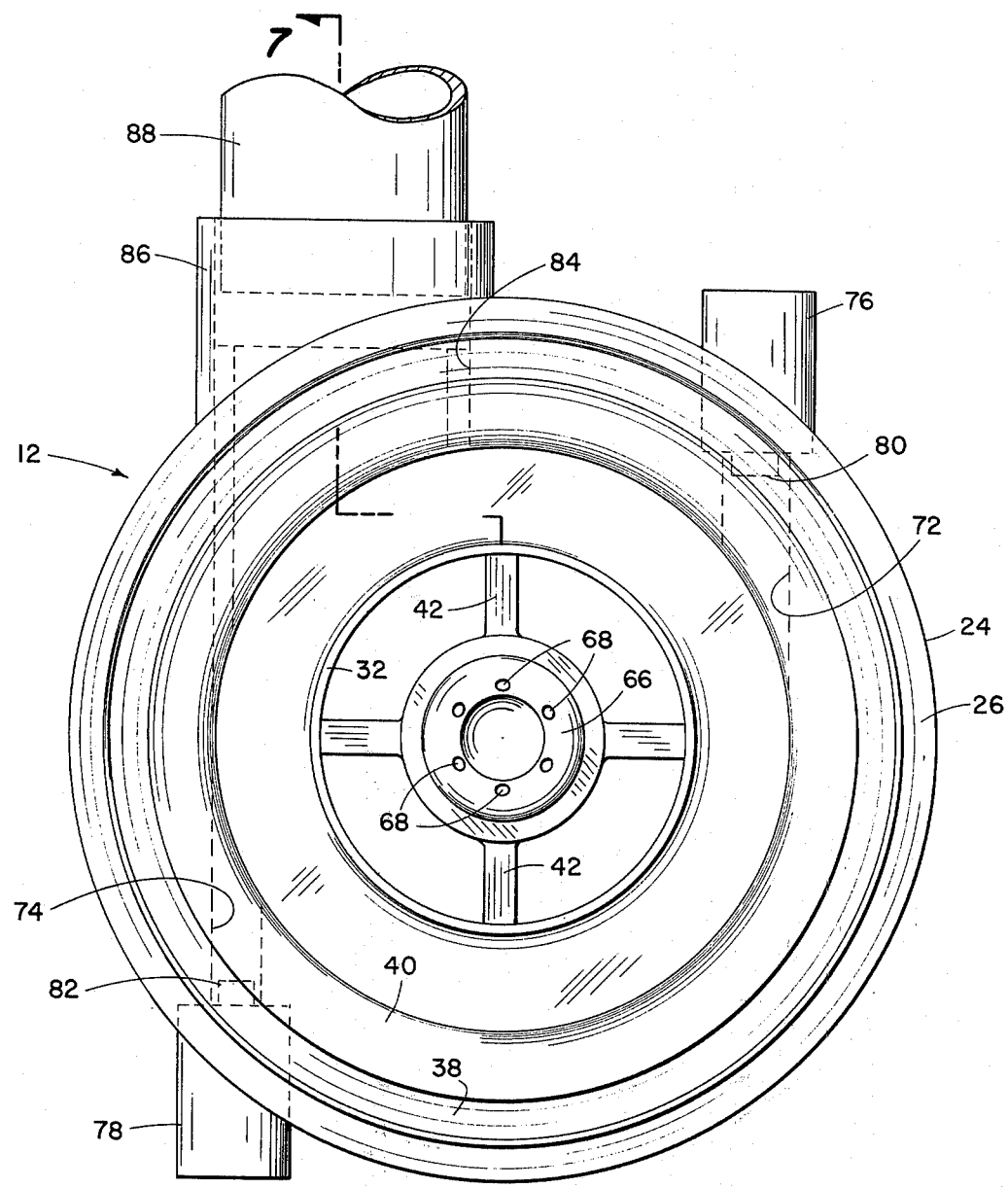
FIG. 6 is a front elevational view of a single burner of FIG. 2
Figure 7:
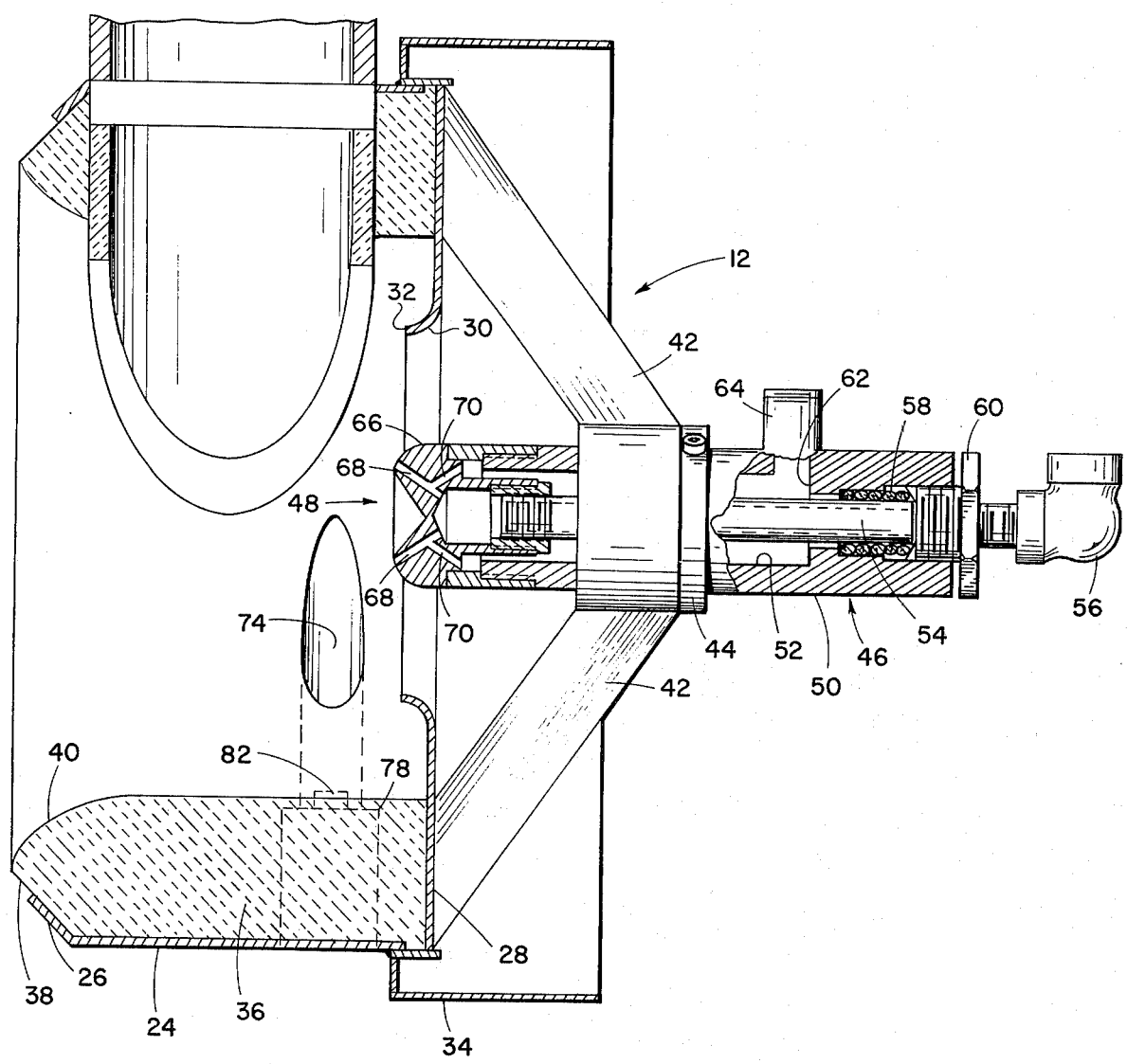
FIG. 7 is a side elevational sectional view of the burner of FIG. 5 taken along the broken line 7—7 of FIG. 5.

Referring now to FIGS. 6 and 7, each burner 12 comprises a cylindrical shroud sleeve 24 having an inwardly directed annular lip 26 at the forward end thereof. The rear end of said shroud sleeve 24 is secured to an annular back plate 28 having a central opening 30 therein, the interior lip 32 of said back plate 28 being directed forwardly into the interior of the shroud sleeve 24. A cylindrical air foil sleeve 34 is secured to the rear end of the shroud sleeve 24 and extends rearwardly from the backing plate 28 for a purpose that will be hereinafter set forth.

A cylindrical thick walled shroud member 36 is disposed within the shroud sleeve 24 and is constructed of refractory material. The forward end of said shroud member 36 is provided with an exterior bevel 38 which conforms to the shape of the annular lip member 26. The inside forward end of the shroud 36 is flared outwardly at 40 and terminates at the outer end of the bevel portion 38. A plurality of gun support members 42 having one end thereof being secured to the back face of the backing plate 28 extend rearwardly and radially inwardly from said backing plate and terminate at a sleeve member 44 which coaxially aligned with the shroud member 36 and shroud sleeve 24.

A cylindrical fuel gun generally indicated by reference Character 46 is slidably disposed in the sleeve member 44 with the forward end or nozzle 48 thereof terminating in substantial alignment with the opening 30 in the backing plate 28.

The fuel gun 46 generally comprises a cylindrical body member having a centrally disposed elongated opening 52 therethrough. An elongated oil feed line 54 is centrally disposed within the opening 52 with the front end thereof extending into the nozzle member 48 and the rear end thereof terminating in a fitting 56. The rear end of the oil line 54 is sealed with respect to the body member 50 by means of suitable packing O-rings 58 and cap nut 60. A steam inlet port 62 is provided in the body of the fuel gun 50 and is in communication with the opening 52 therein. The outer edge of the port 62 terminates in a fitting 64.

The nozzle 48 comprises a plug member 66 for closing the forward end of the opening 52 of the gun body 50, said plug member 66 being provided with a plurality of radially extending bores 68 therethrough the outer end of said bores surrounding the forward end of the nozzle 48 and the inner end of said bores being in communication with the fuel oil line 54. The plug member 66 is also provided with the plurality of radially extending bores 70 which intersect with the bores 68 at one end thereof with the opposite end thereof being in communication with the opening 52 around the exterior of the fuel line 54.

Therefore, fuel entering the fuel inlet port or fitting 56 travels through the fuel line 54 and is ejected through the radial bores 68 in the nozzle 48. Simultaneously steam entering the inlet port 62 surrounds the fuel line 54, travels through the bores 70 and is mixed with the fuel oil in the bores 68 before being injected into the interior of the shroud 36. The steam thereby serves to atomize the oil into tiny droplets for subsequent burning within the shroud member 36 in a manner that will be hereinafter set forth.

The shroud 36 is also provided with a pair of oppositely disposed gas inlet openings 72 and 74, the alignment of said inlet openings being tangential to the inside surface of the shroud member 36. The outer ends of the openings 72 and 74 are enlarged and provided with gas inlet connections 76 and 78 respectively. The inner ends of said gas connections are provided with suitable gas spuds 80 and 82 respectively.

The shroud member 36 and associated shroud sleeve 24 are also provided with a scan tube opening 84 therethrough said opening being in communication with the interior of shroud 36. The outer portion of the opening 84 is provided with a sleeve member 86 for receiving one end of a scan tube 88 therein for purposes that will hereinafter be set forth.

Referring now to FIGS. 2 through 5 a plurality of vertically disposed gas manifold pipes 90 are disposed within the frame of the burner assembly, one such gas manifold pipe for each column 22 of burners. The upper end of the manifold pipe 90 extends through the upper frame member 18 and is attached to a gas inlet pipe 92 which in turn is connected to a gas source (not shown). The lower end of the gas manifold pipe is attached to the lower frame member by an adjustable bracket 94 and is terminated thereat. The mid portion of the gas pipe 90 is provided with a rearward displacement joint 96 as is clearly shown in FIG. 3 which in effect displaces the lower section of the said pipe 90 rearward or upstream of the upper section thereof.

The uppermost burner 12 of each column is attached to one side of the gas manifold pipe 90 by means of suitable brackets 98 whereas the second burner from the top is attached to the opposite side of the pipe 90 by similar brackets 100 which in effect not only vertically separates the upper two gas burners but said gas burners are also transversely offset with respect to each other for a purpose that will be hereinafter set forth. The next lower burner 12 is again attached to one side of the lower portion of the pipe 96 by means of a suitable bracket 102 while the bottom-most burner 12 is attached to the opposite of the lower section of the pipe 90 by means of a bracket 104. This arrangement thereby also offsets the lower two burners transversly with respect to each other and further offsets the lower two burners rearwardly of the upper two burners hence insuring that no burner in any one column is positioned directly above any other burner in that same column.

This lateral and longitudinal offset positioning of the burners 12 is accomplished so that when the scanner pipes 88 are attached to each burner in a manner hereinbefore set forth, and each may extend straight upwardly thru the upper frame member 18 whereby visual sighting of the interior of each burner may be accomplished from a common location, namely the top of the TEG duct 6 in a manner that will be hereinafter set forth.

It was hereinbefore stated the lower end of the scanner pipes 88 are secured to the sleeve 86 of each burner and the upper end thereof extends through the frame member 18 and terminates with an upper cap member 106. The cap member 106 is provided with a pair of photo-sensitive electrical devices 108 which are sensitive to ultraviolet radiation for monitering the presence of a flame within the burner shroud of each burner 12. These photosensitive devices 108 may then be connected to a central monitoring station or enunciator panel (not shown) whereby the presence of flame may be monitored in each burner. By placing two of these photosensitive devices 108 in each cap 106, redundancy is accomplished to provide greater reliability of the flame monitoring system.

The upper end of each scan tube 88 is provided with a purge air inlet pipe 110 which has the outer end thereof attached to an air pressure line 112 which in turn is connected to an air compressor source (not shown). A plurality of scan tube alignment brackets 114 are secured between the said scan tubes 88 and the gas manifold pipe 90 to insure alignment of the said scan tubes 88 with respect to the burners 12.

The gas inlet connections 76 and 78 of each burner are connected to the gas manifold pipe 90 by means of connecting lines 116 and 118 respectively for supplying the gas supply to the gas outlet spuds 80 and 82 of each burner 12.

Each column of burners 22 is also provided with a vertically disposed fuel oil inlet pipe 120, the upper end of said oil inlet pipe 120 extending through the upper frame member 18 and being connected to an oil supply pipe (not shown). The mid portion of the oil inlet pipe 120 is provided with a displacement joint 122 whereby the lower portion of said inlet pipe 20 is displaced rearward of the upper end with respect to the upper end thereof to conform with the general rearward displacement of the lower two burners of each column. The oil inlet port 56 of each burner 12 is then attached to the oil inlet pipe 120 by means of suitable oil lines 124, the lower end of said oil inlet pipe 120 being connected directly to the oil inlet port 56 of the lowermost burner 12.

Each column of burners 22 is also provided with a vertically disposed steam inlet pipe 126, the upper end thereof extending through the upper frame member 18 and being attached to a steam inlet line 128. In most cases the steam inlet line 128 is connected to a bypass steam pipe 130 which has as its source of supply the steam being provided by the steam generator 2 as hereinbefore set forth and shown in FIG. 1 of the drawings. The mid portion of the steam inlet pipe 126 is also provided with a rearward displacement joint 131 thereby causing the lower portion of said steam inlet pipe 126 to be offset rearwardly with respect to the upper portion thereof. The steam inlet ports 62 of each burner fuel gun is connected to the steam inlet pipe 126 by suitable steam lines 132. The lower end of the steam inlet pipe 126 is connected directly to the steam inlet port 62 of the lowermost burner 12.

An elongated horizontally disposed pilot runner 134 is secured between the lower portions of the side frame members 14 and 16, one end of said pilot runner 134 terminating at the frame member 16 by means of a terminal support member 136. The opposite end of the pilot runner 134 extends through the lower end of the side frame member 14 and is connected to a pilot gas inlet line 138 which is in turn connected with a gas supply source (not shown).

Each column of burners 22 is provided with a vertically disposed ignition runner 140, the lower end thereof terminating at a point adjacent the pilot runner 134 and the upper end thereof terminating above the uppermost burner 12. The mid-portion of the pilot runner 140 is provided with a rearward displacement joint 142 so that the lower portion of said pilot runner 140 is displaced rearwardly or upstream of the upper portion thereof. The ignition runner 140 is also provided with a plurality of vertically spaced openings 142 therealong for a purpose that will be hereinafter set forth. The lower end of the ignition runner 140 is attached to the pilot runner 134 by means of a connection line 134.

The burner assembly 10 is provided with an ignition device generally indicated by reference character 146 which is disposed externally of the frame and TEG duct 6. The ignition device 146 comprises the ignition chamber body 148 having an air inlet port 150 at one end thereof and a gas inlet port 152 adjacent thereto. The ignition chamber body 148 is also provided with a suitable spark or glow plug 154 for igniting the mixed gas and air within said chamber. The ignition chamber body 148 is provided with a flame outlet port 156 which extends through the lower portion of the side frame member 14 and terminates with a flame nozzle 158 on the inner end thereof within the burner assembly 10. The flame nozzle 158 is in communication with ports 160 provided in one end of the pilot runner 134.

In operation the burner assembly 10 is installed within a TEG duct 6 as hereinbefore set forth with the shroud members 36 of the burners 12 being directed downstream with respect to the flow of turbine exhaust gas therethrough. Ignition of the burners 12 is accomplished by firing the spark or glow plug 154 while passing a mixture of gas and air therethrough, thereby throwing a flame out of the nozzle 158 into the area of the port 160 of the pilot runner 134. Gas is provided through the gas inlet pipe 138 to the pilot runner 134 to sustain a flame all along said pilot runner. The gas and flame present in the pilot runner 134 is then transmitted through the vertically disposed ignition runners 140 for each column 22 of burners 12.

The burners 12 are then ignited by applying fuel oil through the fuel inlet lines 120 into the fuel inlet port 56 and steam through the steam inlet pipes 126 and into the steam inlet ports 62 of the fuel gun 46.

The fuel and steam is then mixed in the nozzle 48 of the fuel gun and sprayed in a fan shaped pattern into the interior of the shroud member 36, simultaneously turbine exhaust gas flowing through the ducts 6 passes into the air foil chamber created by the cylindrical sleeve member 34 of each burner 12 the air therein being funneled through the air inlet opening 30 of each burner and into the shroud area 36 for mixture with the liquid fuel oil and steam which has been sprayed therein. The fuel, steam and air mixture is then forced through the shroud opening and is dispursed outwardly therefrom and whereby it comes into contact with the ports 142 of the ignition runners 140.

The fuel steam and air mixture is ignited causing a flame to move into the presence of the shroud member 36 of each burner. The flow of turbine exhaust air through the inlet ports 30 of the burners is intercepted by the spray of fuel steam mixture from the nozzle 68 of the fuel gun thereby setting up a swirling pattern causing burning and reburning of the fuel, steam and air mixture which tends to cause complete burning thereof, thereby substantially eliminating smoke and polutents from the burning of the fuel and steam mixture. During the ignition process it may be desirable to apply gas through the inlet ports 72 and 74 of each burner by way of the gas manifold pipes 90 to aid in establishing ignition of all of the burners therein. Further, the burners may be operated on this gas supply alone without the use of the liquid fuel gun 46 if desired. After a flame has been established in the burner it is no longer necessary to utilize the pilot and ignition runners but same may be continuously operated if desired.

Further after ignition of the burner assembly the presence of flame in each burner 12 may be continuously monitored by means of the photo-sensitive devices 108 located in the upper ends of the scanner tubes 88. To prevent smoke or electromagnetic absorption from interfering with the flame monitoring as hereinbefore set forth, purge air is supplied through the lines 110 into the flame scan tubes 88 thereby forcing air downwardly therethrough and out into the interior of the shroud 36 of each burner.

From the foregoing it is apparent that the present invention provides an efficient and economical burner assembly for raising the temperature of turbine exhaust gas to a usable level for operating steam generators or the like.

Whereas, the present invention has been described in particular relation to the drawings attached hereto, it is apparent that other and further modifications apart from those shown or suggested herein may be made within the spirit and the scope of this invention.

What is claimed:

1. A burner assembly for use in hot exhaust gas ducts, said burner assembly comprising a plurality of multi-fuel burners arranged in a planar array transverse to the flow of said hot air within said duct for providing a flame at each burner directed with the flow of exhaust gas within said duct, flame scan means provided through the duct and in communication with each burner for monitoring each burner to determine the presence of flame thereat, said flame scan means comprising a plurality of straight scanner tubes disposed through the upper portion of the duct and extending downwardly, the lower portion of each said tube being in open communication with each burner; said burner array comprising a plurality of columns of burners, each burner being offset laterally from the other burners in the column whereby the upper portion of each burner is exposed to the upper portion of said duct.

2. A burner assembly of claim 1 wherein said hot air duct is operably connected as an input for a steam generator, and wherein said burner assembly is located upstream thereto and each burner being provided with steam inlet means, steam feedback means connected between said steam generator and steam inlet means.

3. A burner assembly as set forth in claim 1 wherein each burner comprises a cylindrical flame shroud, the center line axis of said shroud being in alignment with the flow of hot exhaust gases within the duct, said shroud having a flared opening at the downstream end thereof for flame emission, liquid fuel gun attached to said shroud member, said liquid fuel gun having a nozzle extending into the opposite end of the shroud member, air inlet provided at the end of the shroud member surrounding the nozzle, gas inlet means provided in the shroud member for introducing gas into the interior thereof, flame scan ports provided in the shroud member and operably connected to the flame scan means.

4. A burner assembly as set forth in claim 3 wherein the burner array comprises a frame member having exterior shape and dimensions conforming to the interior cross sectional shape and dimension of the hot air exhaust duct and secured therein, a plurality of columns of burners making up said array and secured to said frame, each burner being laterally offset with respect to said every other burner, the flame scan port of each burner being disposed on the upper surface of the shroud member and operably connected to the flame scan means, gas ignition means carried by said frame member and disposed adjacent to each burner shroud member for igniting said burner.

5. A burner assembly as set forth in claim 1 wherein each column of burners comprises four burners, the upper two burners being spaced vertically and transversely with respect to each other, the lower two burners being spaced vertically and longitudinally with respect to the upper two burners.

6. The burner assembly as set forth in claim 5 wherein the longitudinal displacement of the lower two burners is upstream from the upper two burners.

7. A burner assembly as set forth in claim 1 wherein said fuel gun includes a steam inlet port, an oil inlet port, a chamber for mixing said oil and steam, and a nozzle for spraying said mixed oil and steam in a substantially conical pattern into said flame shroud.

8. A burner assembly as set forth in claim 1 including flame sensing means disposed at the upper end of said flame scanner tubes exteriorly of said duct for detecting flame within said burner, and air-purge means operably connected to each scan tube adjacent said flame sensing means to force air downwardly through each tube thereby clearing said tube of smoke and other gases which would interfere with same flame sensing means.

9. A burner assembly as set forth in claim 8 wherein the flame sensing means comprises at least one ultraviolet photo-sensitive device capable of detecting electro-magnetic radiation emitted by a burner flame.

10. A burner assembly as set forth in claim 9 wherein two ultraviolet photo-sensitive devices are provided for each tube for the purposes of redundancy.

11. A burner assembly for use in hot exhaust gas ducts, said burner assembly comprising:
   a plurality of multi-fuel burners arranged in a transverse array within said duct for providing a flame at each burner directed with the flow of exhaust gas within said duct, said burner array comprising a plurality of columns of burners each burner being offset laterally from the other burners in the column whereby the upper portion of each burner is exposed to the upper portion of the duct;
   flame scan means provided through the duct and in communication with each burner for monitoring each burner to determine the presence of flame thereat, said flame scan means comprising a plurality of straight scanner tubes disposed through the upper portion of the duct and extending downwardly, the lower portion of each said tube being in open communication with each burner;
   flame sensing means disposed at the upper end of each scan tube exterior of said duct,
   air purge means operably connected to the upper end of each scan tube, adjacent said flame sensing means for forcing air downwardly through each tube of smoke and gasses which would interfere with said flame sensing means.

12. A burner assembly as set forth in claim 11 wherein the flame sensing means comprises at least one ultraviolet photosensitive device capable of detecting electromagnetic radiation emitted by a burner flame.

13. A burner assembly as set forth in claim 12 wherein two ultraviolet photosensitive devices are provided for each tube for the purposes of redundancy.

14. A burner assembly as set forth in claim 11 wherein each burner comprises a cylindrical flame shroud, the center line axis of said shroud being in alignment with the flow of hot exhaust gasses within the duct, said shroud having a flared opening at the downstream end thereof for flame emission, liquid fuel gun attached to said shroud member, said liquid fuel gun having a nozzle extending into the opposite end of the shroud member, air inlet provided at the end of the shroud member surrounding the nozzle, gas inlet means provided in the shroud member for introducing gas into the interior thereof, flame scan ports provided in the shroud member and operably connected to the flame scan means.

15. A burner assembly as set forth in claim 14 wherein the burner array comprises a frame member having exterior shape and dimensions conforming to the interior cross sectional shape and dimension of the hot air exhaust duct and secured therein, a plurality of columns of burners making up said array and secured to said frame, each burner being laterally offset with respect to said every other burner, the flame scan port of each burner being disposed on the upper surface of the shroud member and operably connected to the flame scan means, gas ignition means carried by said frame member and disposed adjacent to each burner shroud member for igniting said burner.

16. A burner assembly as set forth in claim 11 wherein each column of burners comprise four burners, the upper two burners being spaced vertically and transversely with respect to each other, the lower two burners being spaced vertically and longitudinally with respect to the upper two burners.

17. The burner assembly as set forth in claim 16 wherein the longitudinal displacement of the lower two burners is upstream from the upper two burners.

18. A burner assembly as set forth in claim 14 wherein said fuel gun includes a steam inlet port, an oil inlet port, a chamber for mixing said oil and steam, and a nozzle for spraying said mixed oil and steam in a substantially conical pattern into said flame shroud.

19. A burner assembly of claim 11 wherein said hot air duct is operably connected as an input for a steam generator, and wherein said burner assembly is located upstream thereto and comprises a plurality of multi-fuel burners arranged in an array within said duct each burner being provided with steam inlet means, steam feedback means connected between said steam generator and steam inlet means.

* * * * *